April 14, 1936.  H. GEORGE  2,037,228
MOLD AND METHOD OF MANUFACTURING THE SAME
Filed Dec. 30, 1933
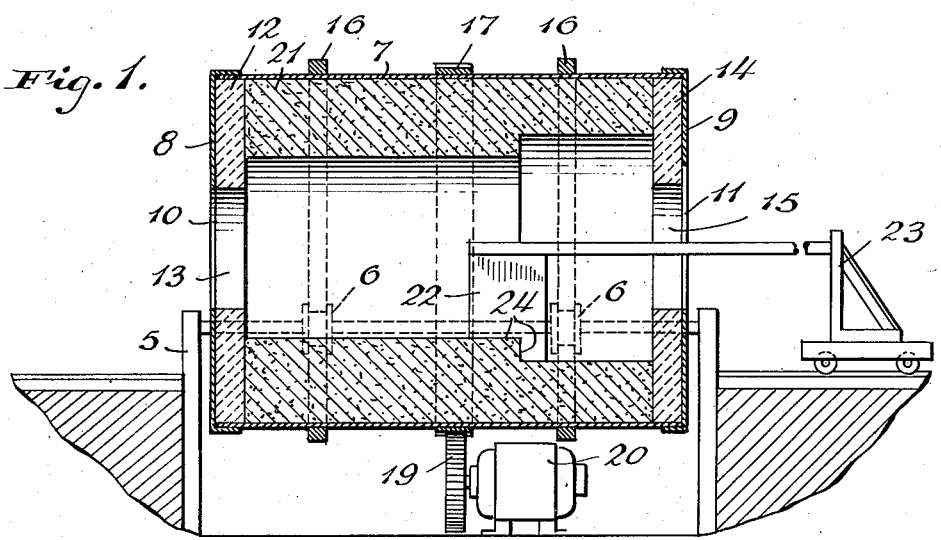
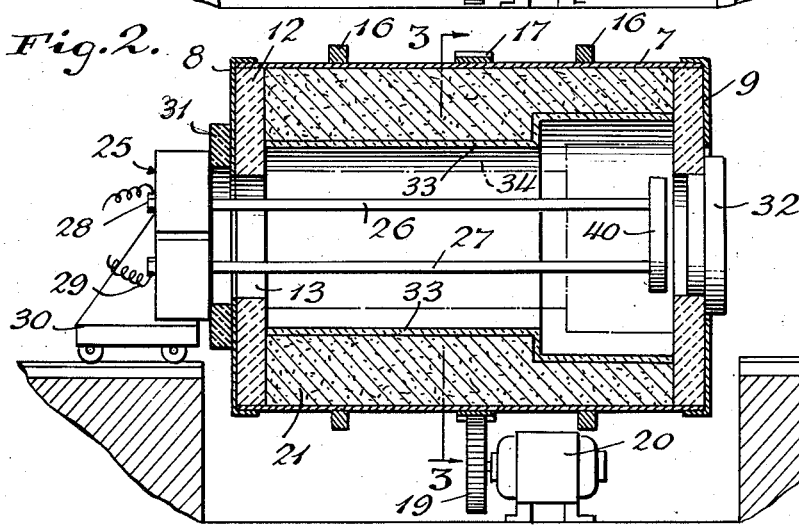
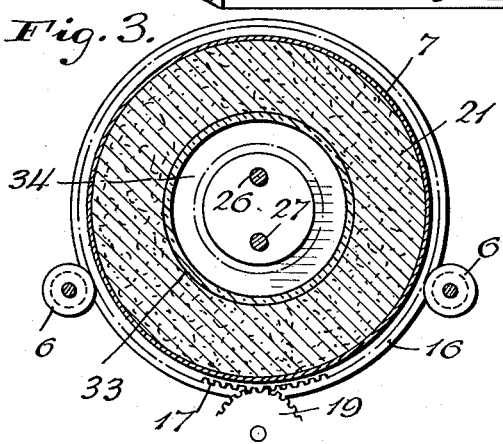
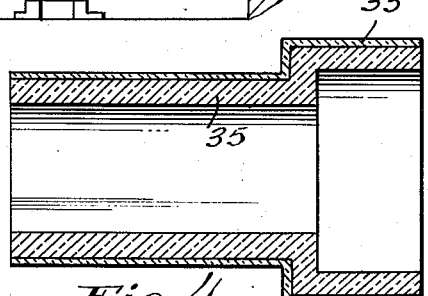
INVENTOR
HENRI GEORGE
BY
ATTORNEYS

Patented Apr. 14, 1936

2,037,228

UNITED STATES PATENT OFFICE

2,037,228

MOLD AND METHOD OF MANUFACTURING THE SAME

Henri George, Paris, France, assignor to Societe Anonyme Des Manufactures Des Glaces & Produits Chimiques De Saint-Gobain, Chauny & Cirey, Paris, France Application December 30, 1933, Serial No. 704,662
In France December 30, 1932

6 Claims. (Cl. 25—156)

This invention relates to refractory molds made of granulated or comminuted substances and used for the casting of articles consisting of a fusible material poured in a molten state into the mold; the invention relates more particularly to a method of manufacturing refractory molds of this type.

An object of the present invention is the provision of a refractory mold for handling substances of metal and glass or similar substances having a very high fusing point and a comparatively low heat conductivity.

Another object is the provision of a simple and inexpensive method of manufacturing molds in a very short time.

A further object is the provision of a mold, which can be quickly and easily taken apart after the casting has been completed.

Still another object of this invention is the provision of a mold consisting of materials, a larger part of which may be used in the manufacture of another mold after the first-mentioned mold has served its purpose.

The above and other objects of this invention may be realized by a method of manufacturing a refractory mold, which comprises introducing a granulated or comminuted refractory substance having a fusion point higher than the substance to be molded into a casing rotated around its central axis; the granules of the refractory substance are projected against the walls of the casing by centrifugal forces developed in the course of rotation of the latter and are distributed in even layers around the walls of said casing by the use of a templet of a predetermined size. The inner surfaces of the layers formed by the comminuted substance are dried and then glazed by fusion through the use of any convenient heating element, such as an electrical resistance.

After the mold has been completed, the molten material is introduced into it while the casing is being rotated, so that the molten material is pressed against the glazed walls of the mold by centrifugal forces.

After the completion of the casting the rotation of the casing is interrupted and the mold is taken apart by removing the casing along with such portions of the refractory comminuted substance which have not been glazed by the heating element.

The invention will appear more clearly from the following detailed description when taken in connection with the accompanying drawing showing a preferred embodiment of the inventive idea.

In the drawing:

Figure 1 is a vertical section through a mold, and illustrates the method of manufacturing the same.

Figure 2 shows the same mold during the glazing process.

Figure 3 is a section along the line 3—3 of Figure 2.

Figure 4 is a section through a casting.

The mold illustrated in the drawing comprises a metallic casing 7, which may have any suitable shape such as that of a cylinder, prism, pyramid or cone. A pair of metal discs 8 and 9 serve as covers for the casing 7. The metal cover 8 is provided with a central opening 10, while the cover 9 is provided with the opening 11.

A large round plate 12 made of a refractory material is situated within the casing 7 close to the disc 8 and is provided with a central opening 13 having, preferably, the same size as the opening 10. A similar plate 14 is provided within the casing 7 close to the cover 9 and has a central opening 15 which may be somewhat smaller than the opening 11.

The cylinder 7 is provided with annular members 16 and 17, which are rigidly connected with the casing 7 by any suitable means. The ring or member 17 is engaged by a gear 19, which may be driven by a suitable motor 20. Rollers 6 are used for supporting the members 16. The device is carried by a frame 5.

The casing 7 is rotated at a uniform speed by the motor 20 through the provision of the gear 19 which is driven by the motor and which drives the member 17.

To manufacture the inner walls of the mold a comminuted or granulated refractory substance 21 is introduced into the interior of the casing 7 through the opening 13 or the opening 15.

The particles of the refractory substance 21 are pressed against the walls of the casing 7 by the action of the centrifugal forces developed in the course of rotation of the casing 7 and are maintained there in the form of a hollow body by these forces.

Then a templet 22 carried by any suitable support 23 is introduced into the interior of the casing 7. The templet 22 is brought in contact with the comminuted substance 21 to form layers of a predetermined thickness, and to distribute the substance 21 along the inner walls of the casing 7.

The edges 24 of the templet 22 may be of any suitable shape corresponding to the desired shape of the casting.

After the comminuted substance 21 has been shaped to the desired extent, the templet 22 is removed and an electric heating element 25 is introduced into the interior of the mold while the casing 7 continues to be rotated.

The heating element 25 shown in Figure 2 of the drawing comprises two resistances 26 and 27 connected in series with each other by a conductor 40. The resistance 26 is connected with a terminal 28, while the resistance 27 is connected with a terminal 29.

The terminals 28 and 29 may be connected with any suitable source of electrical energy, which is not shown in the drawing. The heating element 25 is preferably carried by a movable support 30.

A ring 31 consisting of an insulating material is preferably inserted between the mold and the support 30 before the heating element 25 is introduced into the interior of the mold.

The casing 7 continues its rotation while the heating element 25 is inserted into the casing 7 through the openings 10 and 13. It is advisable to close the openings 11 and 15 situated at the opposite end of the mold by a closure 32, which is preferably made of a heat insulating material. Then the terminals 28 and 29 are connected to a source of electrical energy so that heat is radiated by the resistances 26 and 27. The comminuted substance 21 is first dried by this heat.

The heat is gradually increased until the inner surfaces of the comminuted substance 21 are glazed by fusion so that they form a glazed coating 33.

Then the heating element 25 is removed from the mold and a fusible molten substance such as glass, is introduced into the interior of the mold.

The rotation of the mold is continued with the result that the molten substance 34, shown by broken lines in Figures 2 and 3 is pressed against the glazed surfaces 33 until it solidifies.

After the solidification of the molten substance 34 has been completed, the rotation of the casing 7 is interrupted and then the covers 8 and 9 are taken off. Finally the casing 7 is removed.

The comminuted refractory substance 21 may be used for the manufacture of another mold. The glazed surface 33 which forms a thin layer around the casting 35 (Figure 4) is broken up and the casting 35 is obtained.

Due to the provision of glazed surfaces 33 the casting 35 has a very smooth outer surface.

A mold made in accordance with the present invention and comprising granulated refractory materials has a higher fusing point and a lower coefficient of conductivity of heat than molds consisting of ground materials which are held together by a binder of any kind. Furthermore, it can be more quickly and easily manufactured than molds formed of plastic materials.

What is claimed is:

1. In the art of manufacturing molds, the steps of lining an enclosure with granules of a granulated refractory material having a fusion point higher than the substance to be molded to form a hollow refractory mold having inner surfaces which come in contact with a molten substance when the mold is being used for the purpose of making a casting, and fusing those portions of said mold which are nearest to said inner surfaces, said portions being solidified before a molten substance is brought in contact with said inner surfaces for the purpose of making a casting.

2. In the art of manufacturing molds, the steps of lining an enclosure with granules of a granulated refractory material having a higher fusion point than the substance to be molded to form a hollow refractory mold having inner surfaces which come in contact with a molten substance when the mold is being used for the purpose of making a casting, drying the entire mold and fusing those portions of said mold which are nearest to said inner surfaces, said portions being solidified before a molten substance is brought in contact with said inner surfaces for the purpose of making a casting.

3. In the art of manufacturing molds within a rotating enclosure, the method which involves utilizing centrifugal force for applying granules of a granulated refractory material having a fusion point higher than the material to be molded against the walls of said rotary enclosure to form a hollow refractory mold, said mold having inner surfaces which come in contact with a molten substance when the mold is being used for the purpose of making a casting, and fusing those portions of said mold which are nearest to said inner surfaces, the last-mentioned step taking place while the enclosure is being rotated and before a molten substance is brought in contact with said inner surfaces for the purpose of making a casting.

4. In the art of manufacturing molds within an enclosure rotating around an axis, the method which involves utilizing centrifugal force for applying granules of a granulated refractory material having a fusion point higher than the substance to be molded against the walls of said rotary enclosure to form a hollow refractory mold, said mold having inner surfaces which come in contact with a molten substance when the mold is being used for the purpose of making a casting, and passing a heating current along said axis for the purpose of fusing those portions of said mold which are nearest to said inner surfaces, the last-mentioned step taking place while the enclosure is being rotated and before a molten substance is brought in contact with said inner surfaces for the purpose of making a casting.

5. In combination, the steps of lining an enclosure with granules of a granulated refractory material having a fusion point higher than the substance to be molded to form a hollow refractory mold having inner surfaces which come in contact with a molten substance when the mold is being used for the purpose of making a casting, fusing those portions of said mold which are nearest to said inner surfaces, introducing a molten substance into the interior of said mold after said portions have solidified, removing the casting after said molten substance has solidified, and recovering the granulated refractory material by breaking up the molten and solidified portions of said mold, whereby the recovered granulated material may be utilized for the manufacture of another mold.

6. In combination, an enclosure for forming a mold, a lining for said enclosure, said lining consisting of a granulated refractory material having the form of a hollow refractory mold provided with inner surfaces which come in contact with a molten substance when the mold is being used for the purpose of making a casting, said inner surfaces being fused prior to the introduction of said molten substance, whereby they are subsequently solidified.

HENRI GEORGE.